Figure 1:
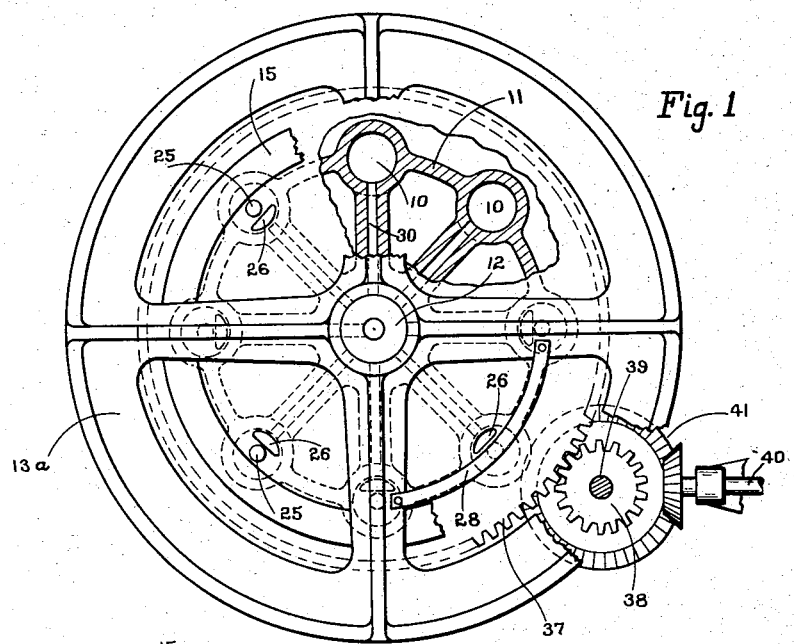

Jan. 16, 1923.

A. R. SPENCER ET AL.
APPARATUS FOR TREATING MATERIAL.
FILED MAY 26, 1919.

1,442,304.

3 SHEETS—SHEET 1.

INVENTORS
Arthur R. Spencer
and William J. Plive
By Thurston Kwis & Hadson
ATTORNEYS

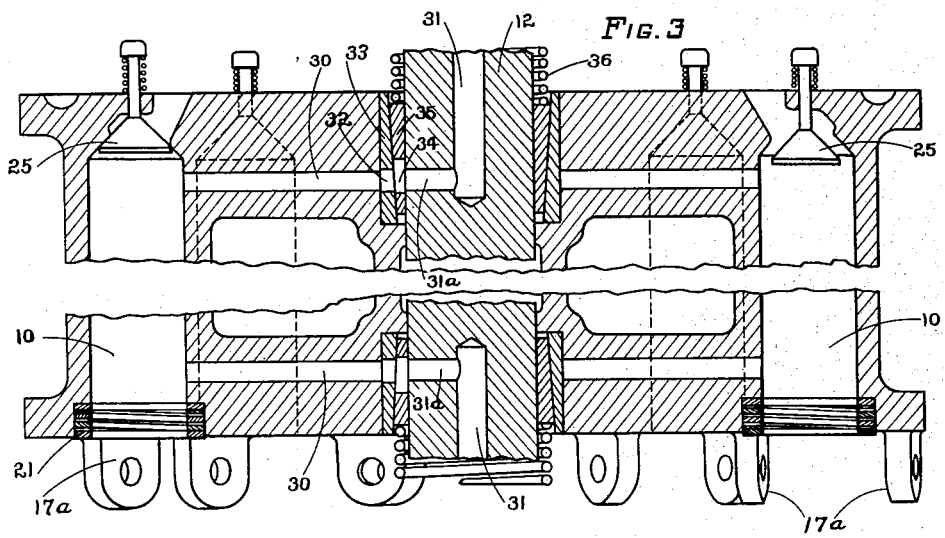
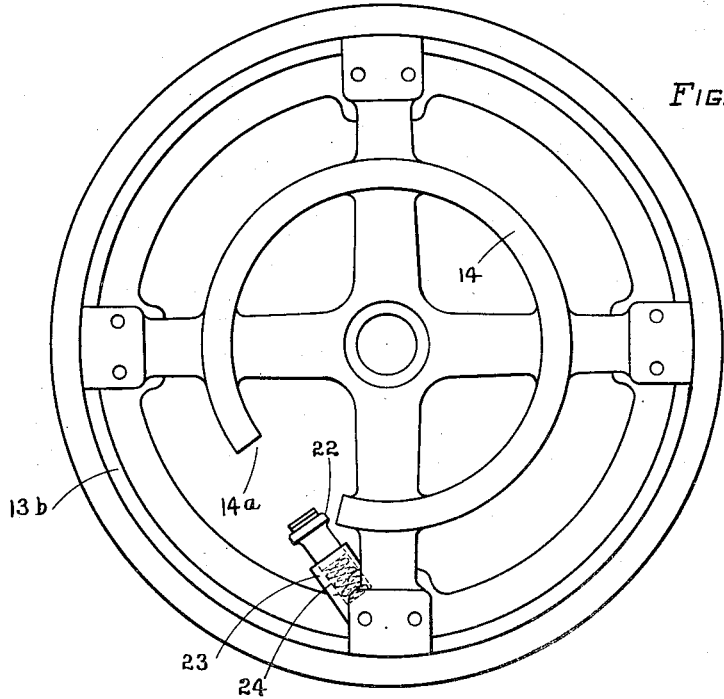

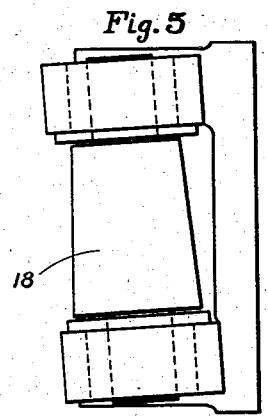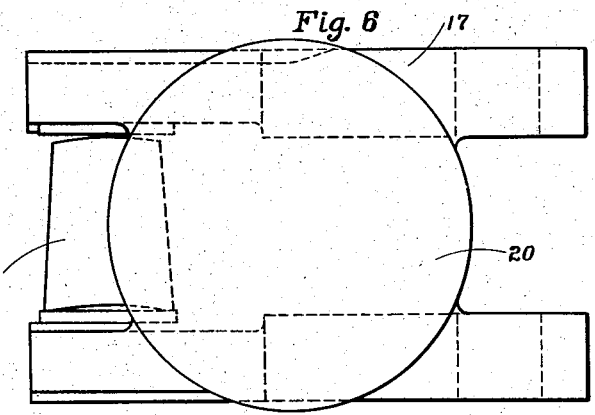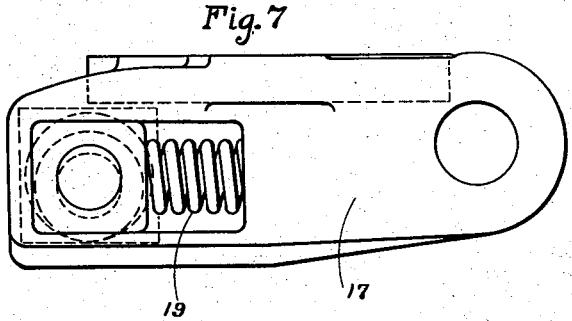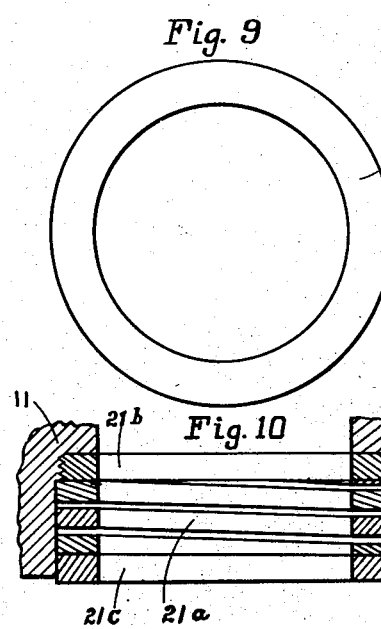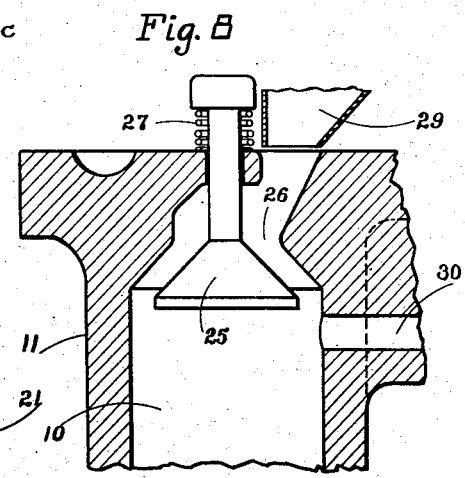

Patented Jan. 16, 1923.

1,442,304

UNITED STATES PATENT OFFICE.

ARTHUR R. SPENCER AND WILLIAM J. PLEWS, OF CLEVELAND, OHIO.

APPARATUS FOR TREATING MATERIAL.

Application filed May 26, 1919. Serial No. 300,012.

*To all whom it may concern:*

Be it known that we, ARTHUR R. SPENCER and WILLIAM J. PLEWS, the former a citizen of the United States and the latter a subject of the King of Great Britain, and residents, respectively, of Cleveland, in the county of Cuyahoga and State of Ohio, and Cleveland, in the county of Cuyahoga and State of Ohio, have invented a certain new and useful Improvement in Apparatus for Treating Material, of which the following is a full, clear, and exact description.

This invention relates to an apparatus for treating materials such as cereals and other cellular or fibrous materials for the purpose of puffing or increasing their bulk, and also for the purpose of disintegrating organic and inorganic materials such as vegetable, mineral and animal fibrous materials.

The apparatus has particular utility in the puffing of cereals such as rice, wheat and corn, and for convenience in describing the parts of the machine and its operation, the material acted upon will be assumed to be a cereal, and the operation a puffing operation, the apparatus constituting the subject matter of this application being in one respect an improvement over the apparatus at present used for performing the latter operation.

The chief object of the invention is to secure greater economy of operation and to improve the product. More specifically the invention aims to reduce the time required in puffing or treating the material, to reduce the manual labor required in operating the apparatus, to increase the capacity of the apparatus, and at the same time to decrease its bulk and thereby reduce the floor space required for its installation and operation, and by way of improving the product we aim to provide a more uniform and palatable product in the respect that all or substantially all the grains are puffed uniformly and to the desired extent, and to eliminate waste and so-called screenings.

It is the aim also to provide an apparatus capable of being used for producing an enlargement of other materials than cereals or food products, and for the purpose of disintegration of other products which can be changed to comminuted state such as powderous form.

In carrying out our invention we provide a machine which is wholly automatic, this machine including a traveling member provided with one or more chambers in which the material to be treated is received, which chamber, or each of the series of chambers is successively and automatically supplied with a predetermined quantity of material, then with the treating fluid which may be under high pressure or high temperature or both, and which in the case of cereals is utilized to soften the shells of the grains to reduce the moisture content of the latter and to permeate the minute cells so as to puff or increase the bulk of the same when the expansion occurs, and finally is quickly opened to the atmosphere so that the materials may be suitably acted on by the treating medium as it suddenly expands and will at the same time be discharged from the chamber.

In the preferred embodiment, the machine includes a rotating member which may be in the form of a casting and is arranged to rotate about a fixed axis, this member having a series of chambers to which the material being treated is successively supplied when they pass one at a time into registration with the material delivery member, each chamber having a valve which at the proper points in the cycle of movement is first opened for the admission of the material and thereafter closed. Additionally, provision is made for supplying the treating medium, preferably steam, but which may under certain circumstances be air or gas, and for withdrawing the medium, these operations of supplying and withdrawing the treating medium being preferably accomplished by means of ducts leading to the chambers and successively and automatically brought into registration with supply and exhaust ports. Furthermore, in the machine herein illustrated, the chambers are normally held closed by covers arranged at their lower ends, these covers being pivotally mounted to swing to and from closed position, and being normally held closed by the engagement of rollers carried thereby with a track, the arrangement being such that as each chamber reaches a given point in its travel, the cover is suddenly opened for the discharge of the material, and expansion and discharge of the treating medium, after which the cover is again closed automatically, whereupon the cycle of operations is repeated.

The invention may be further briefly summarized as consisting in certain novel details of construction, and combinations and arrangements of parts which will be described in the specification and set forth in the appended claims.

Figure 2:
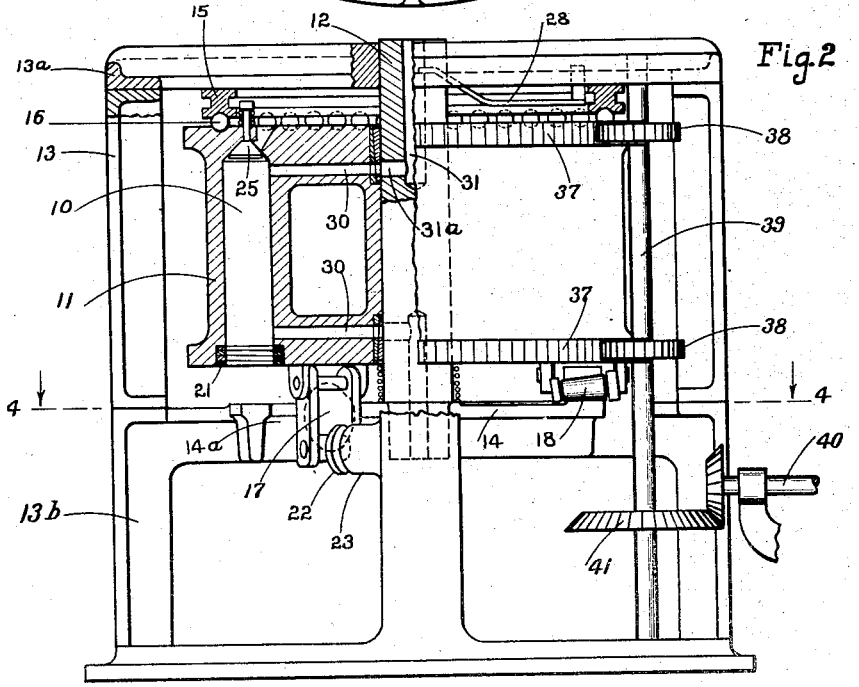

In the accompanying sheets of drawings illustrating the preferred embodiment, Fig. 1 is a top plan view of the machine with parts in section and omitting the hopper or chute by which the material to be treated is delivered to the chambers, and omitting also the piping by which the treating medium, such as steam, is supplied and drawn off from the chambers; Fig. 2 is a side elevation of the same, partly in section; Fig. 3 is a vertical sectional view of the rotary member which is provided with the several treating chambers, and showing also a portion of the stationary shaft about which the rotary member rotates; Fig. 4 is a sectional view substantially along the line 4—4 of Fig. 2, looking in the direction indicated by the arrows, this view showing the substantially circular but segmental track which is engaged by the rollers carried by the chamber covers; Figs. 5, 6 and 7 are respectively an end, a plan, and an edge view of one of the chamber covers; Fig. 8 is a detail sectional view showing especially the valve at the top of the chamber and the manner in which the material to be treated is supplied thereto; and Figs. 9 and 10 are respectively a plan and a sectional view of a yielding seat which is provided for the cover at the lower end of each chamber.

Referring now to the figures of the drawings, it will be seen that the material is treated in one or more chambers formed in a rotary member 11, preferably in the form of a casting, and in this instance arranged to rotate about the axis of a stationary vertical shaft 12.

While it is immaterial as far as the broad features of our invention are concerned, that there be more than one of these chambers, we prefer that a number of chambers be provided, for we find that better results are obtained, especially in the treatment of certain materials such as in puffing cereals, and at the same time a machine of large capacity is obtained, by providing a fairly large number of treating chambers, each receiving a fairly small quantity of material. In this instance the rotary member 11 is provided with eight chambers 10, which are vertically disposed, and are arranged in circular formation about the axis of the shaft 12, these chambers being equal distances apart.

The rotary member 11 is supported in a stationary frame 13, which is provided with a top 13$^a$ and a base 13$^b$, the top and bottom members also supporting in vertical position the stationary shaft 12. The member 11 is supported in the frame for rotary movement by a lower circular track 14 on the base 13$^b$ of the frame, and by an upper circular track 15, the top of the member 11 and lower face of the track 15 having races for a series of balls 16 through which is transmitted to the frame the upward thrust created by the pressure with which the hinged covers at the lower ends of the chambers are held closed. It will be observed by reference to Fig. 4, that the lower track 14 is continuous or unbroken for the major portion of its circumference, but at one point has an open section designated 14$^a$.

The chambers are designed to be tightly closed at their lower ends by hinged covers 17, each pivoted to pairs of depending ears 17$^a$ on the bottom of the rotary member 11. Each cover has at its free end a roller 18, designed to engage the lower track 14, the rollers of the several covers constituting the means by which the rotary member 11 is supported on the track 14, and by which it is pressed upward against the upper track. The rollers are slightly tapered, as shown in Figs. 5 and 6, and their axes are slightly inclined, as indicated in Figs. 5 and 7, so that the inner and outer portions of the rollers will have a true rolling action on the track 14.

Furthermore, in order that the covers may be swung from closed position to full open position quickly, the bearings for each roller are slidingly mounted in the side portions of the cover and are capable of yielding inward towards the pivotal axis of the cover against the action of springs 19, shown in Fig. 7. The purpose of this feature and its action will be explained subsequently.

Each cover has a flat circular face 20 adapted to be pressed firmly upward by the action of the fixed track 14 on the roller 18 against a yielding seat 21 secured in the lower end of the chamber 10, with which the cover is associated. This yielding seat, as is shown clearly in Fig. 10, includes a spiral metal member 21$^a$, secured at its ends to upper and lower rings 21$^b$ and 21$^c$, the former being secured in the chamber, preferably by screwing it therein, as indicated in Fig. 10, and the latter ring 21$^c$, as well as the spiral member 21$^a$, having a close working fit in the lower part of the chamber so that they may yield upwardly when the cover is pressed against the lower ring 21$^c$ as the roller 18 rides up on the track 14. This yielding seat compensates for expansion and contraction of the rotary member 11, and compensates for irregularities in the position of the cover.

It will be seen, therefore, that the lower end of the chamber will be closed for the major portion of one complete circular movement of the chamber, or as long as the roller 18 engages the track 14, but when in the rotation of the rotary member 11, each chamber is brought to a point such that the roller of its cover reaches the end of the track, or the beginning of the cut-out section 14ª, the cover will swing to open the chamber, and since at the instant of opening, the chamber contains steam or other treating fluid under high pressure. the cover will be thrown open forcibly and quickly, and as the center of the roller passes beyond the end of the track, the pressure on the inner side of the cover will shift the roller inwardly towards the pivotal axis of the cover and against the action of the springs 19, and thus cause instant opening, and eliminate delay which would ensue if the roller were mounted to rotate on a fixed axis, and were required to roll over the end of the track.

When the cover is thus thrown open it strikes a yielding abutment which is supported on the base beneath the track 14, this abutment being in the form of a plunger 22, mounted to yield in an air cylinder 23, which will have a small port for the escape and admission of air, and contains a spring 24 which will move the plunger forwardly or restore it to its normal position after it has been engaged by the cover. Shortly after the cover has been thrown open in the manner just stated, due to the continued rotation of the member 11, the roller will again ride up on the track 14 so as to close the associated chamber and assist in supporting the member 11.

At the top of each chamber 10, a valve 25 is provided for the admission of the cereal or other material to be treated. This valve in this instance is conical, and is normally held up against a conical seat at the lower end of an inlet opening 26, by means of a coil spring 27 surrounding the vertical stem of the valve which projects upwardly through the top part of the member 11. The valves 25 in the several treating chambers 10 are automatically opened to receive the material to be treated, and are then automatically closed. Any suitable means may be provided to cause the opening and closing of the valves, but we show in this instance a valve operating cam 28, in the form of a fixed curved strip supported by the frame 13, and so positioned that when during the rotation of the member 11 the chamber reaches a given position, the upper end of the valve will pass underneath this strip and will be depressed so as to open the valve. Simultaneously, a measured or predetermined amount of material passes into the opening 26 and from the latter into the chamber, from a delivery chute 29, a portion of which is shown in Fig. 8, and the lower end of which is so positioned that the receiving openings 26 will pass thereunder. When the receiving opening of a chamber is directly beneath this chute, valves or other suitable means which control the passage of material from the chute to the chamber are automatically operated to cause the desired amount of material to pass to the chamber. Shortly after the opening of the valve 25, the latter passes from beneath the valve operating strip 28, and is closed by the spring 27, and remains closed until it is again opened on the next revolution of the member 11, whereupon the filling action is repeated, it being understood that the material supplied to the chamber remains therein during the major portion of one revolution of the member 11, and is discharged therefrom in the manner stated when the roller of the cover at the bottom of the chamber rides off the track 14. The operation of the parts is so timed that the valve at the top of the chamber is opened and the material is supplied to the chamber immediately after the cover at the bottom of the chamber is closed following the opening thereof and the discharge of material.

Treating fluid is supplied to the chamber immediately after it receives its charge of material to be treated, and this likewise is done automatically. In fact, provision is made for automatically supplying and withdrawing the treating fluid a number of times in the interim between the receiving of the material in the chamber and the discharge thereof from the chamber. Whether the treating fluid is admitted and drawn off one or more times, and also the character of the treating fluid will depend upon the character of material being treated in the chambers and the particular operation, i. e. whether a puffing or a disintegrating operation that is to be performed. For the puffing of grain or cereals, high pressure steam which may be superheated, will be employed as the treating medium, and preferably steam will be alternately supplied and drawn off from the chamber repeatedly before there is supplied the final injection of high pressure steam which is in the chamber at the time it is opened to cause the expansion which puffs the cereal.

The treating fluid is supplied, or both drawn off and supplied through radially disposed ducts 30 which in this case extend from the upper and lower portions of each chamber horizontally inward toward the shaft 12 which has axially disposed ducts 31, (see Fig. 3) with lateral extensions 31ª with which the radial ducts 30 are designed to be brought into registration as the rotary member 11 rotates about the shaft. The ducts 30 are automatically placed in communication with the lateral extensions of the supply or supply and exhaust ducts 31, when ports 32 located at the inner ends of the ducts 30 and provided in tapered bushings 33 which rotate with the rotary mem- 13 ber 11, come into registration with ports 34, provided in stationary tapered bushings 35 which surround the shaft 12. The two pairs of bushings 33 and 35 are carefully machined so as to form steam tight joints, and they are held tightly together by springs 36 which press the inner bushings axially inward against the tapered faces of the outer rotating bushings 33 and thus compensate for any wear which may take place. Preferably the inner bushings 35 are connected to the shaft by feather keys which hold the bushings against rotation but allow vertical or axial movement necessary to compensate for wear and to maintain the working faces of the pairs of bushings in suitable tight engagement.

The rotary member 11 may be driven intermittently or continuously, but preferably is given a continuous movement, and although it may be driven in various ways, in this instance the upper and lower portions of the rotary member 11 are provided with gear teeth 37 which are engaged by pinions 38, secured to a vertical shaft 39, suitably supported in the frame 13, this shaft being driven by a suitable drive shaft 40, and bevel gearing 41 which connects the two shafts.

In the puffing of cereals in their natural or undesiccated state, we prefer that high pressure, and preferably superheated steam be supplied through the lower shaft duct 31, and through the lower radial ducts 30 to the chambers, in which event the lower duct 31 of the shaft will be connected by piping, not shown, to a suitable source of high pressure steam at the desired temperature, and we prefer also that the upper shaft duct 31 be connected by piping, not shown, to a suitable vacuum exhausting device. The ports 32 and 34, as well as the radial extensions 31a of the shaft ducts are so positioned that in the travel of each chamber from the time it receives its charge of material until the cover at the lower end thereof is opened, the lower and upper ducts 30 leading thereto will be alternately and repeatedly placed in communication with first the source of steam, and then with the vacuum withdrawing device, and finally a suitable time before the chamber is opened, with the source of steam, the final injection of steam remaining in the chamber under pressure until the cover is opened and the expansion takes place which puffs the grain.

The preliminary injections of steam prior to the final injection which is utilized in the puffing operation, perform the functions of softening the skins or shells enclosing the grains and of de-hydrating the grains. Additionally they have a toasting effect on the grains, superheated steam being preferably employed.

The means for automatically supplying and withdrawing the steam or treating fluid herein illustrated, affords great flexibility in the operation of the machine and in the results and precise functions obtained or performed. For example, the number of steam injections and withdrawals can be readily varied to suit the exigencies of any particular case by varying the location or number, or both, of the ports 34 of the stationary sleeves, and of the lateral duct extensions 31a. In treating cereals in their natural state, at present we prefer that there be two injections of superheated high pressure steam and withdrawals thereof prior to the final injection of steam which subsequently performs the puffing operation, but this number may be varied as may be found necessary. It will be understood that in the preliminary steam treatments no puffing of the grains occurs when the steam is withdrawn, for the reason that the withdrawal does not occur with sufficient rapidity to cause the steam occupying the cells of the grains to have any material expanding action on the grains.

In the event the machine is used for puffing cereals already de-hydrated to an extent such that the grains have the desired moisture content, the preliminary injections of steam may be omitted, in which event the upper series of ducts may be closed and steam may be admitted one or more times through the lower series of ducts without exhausting it from the chambers, or steam may be alternately admitted through both the lower ducts and upper ducts, the number of such injections of steam and the intervals between injections being variable in the manner already stated, it being understood that if there is a single injection of steam into the chamber as it passes in its cycle of movement from the filling point to the puffing point, there will be simply one port 34 in one of the sleeves 35, and if there are to be more than one injection, the number of these ports will be varied accordingly.

It is to be understood that as the member 11 rotates, the different chambers will be successively supplied with material to be treated, and as they travel around the axis of the shaft 12, they will successively and automatically receive one or more times as above stated, injections of steam or other treating fluid.

The covers at the lower ends of the chambers are held tightly closed as the rollers carried by the covers travel around upon the continuous or unbroken section of the track 14, but as the rollers come to the end of the track 14, the covers are successively suddenly thrown open, and since the chambers are vertical, and the steam in the chambers not only has permeated the grains themselves, but fills the pockets at the top of the chambers (the chambers being preferably not entirely filled with material to be treated) and as the steam cannot escape from these pockets prior to the expulsion of the cereal in the chambers, it follows that all the cereal in each chamber will be expelled almost instantaneously. The result is that the steam in all the grains throughout the mass or quantity in the chamber has a substantially uniform puffing action thereon, so that the product is uniformly puffed and the percentage of so-called screenings is reduced to a minimum. In these respects the apparatus constituting the subject matter of this invention is a very decided improvement over apparatus in use at the present time for puffing cereals.

The chambers are thus opened to cause the discharge and puffing of the cereal, a short distance in advance of the filling point, and immediately after, they are again closed by the track 14, and then again receive charges of material to be treated as the ends of the valves pass one at a time beneath the valve operating cam or strip 28.

It should be noted in passing, that no manual work at all is required in the operation of this machine, but all operations are automatic. Thus the cost of operating the machine is very low, and in this respect also, the machine has a distinct advantage over the apparatus in use at the present time for this purpose. Finally it should be noted that since the operation of the machine is continuous, and since it preferably has a considerable number of treating chambers, and further since the time required for one complete cycle of movement is small, (one complete rotation taking place preferably in less than a minute) the machine has very great capacity in the amount of material that can be treated in a given space of time, and this is true notwithstanding the fact that the machine is not bulky, but on the other hand is compact and occupies comparatively small floor space.

The type of treating fluid will, as before stated, vary with the kind of material being treated, and although in puffing cereals the treating fluid is preferably steam, nevertheless other treating fluids may be employed, such as air at suitable pressure, or a gas other than steam which will be injected at proper pressure and temperature to produce the desired results.

While we have explained the operation in connection with the puffing of cereals, it is an important feature of the machine that it may be used for the treatment of other products or materials, and the treatment may be wholly different in character than the puffing or bulk increasing treatment. That is to say, materials other than cereals may with this machine be subjected to a suitable puffing or bulk increasing treatment, and other materials may with the machine be given a disintegrating treatment by supplying the material to the chambers and subjecting it to a disintegrating fluid such as air under high pressure, and then suddenly expanding the treating fluid to cause the material to be disintegrated by being reduced to a powderous, flaky or threaded state, depending upon the kind and composition of the material being treated.

While we have shown only the preferred form of the invention, we do not wish to be confined to the precise details or arrangements shown, as other ways and devices for carrying out the principle of the invention may occur to one skilled in the art, and we aim in our claims to cover all modifications which do not involve a departure from the spirit and scope of our invention in its broadest aspects.

Having described our invention, we claim:

1. In a machine of the character described, a movable member having a treating chamber, means for moving said member through a definite path of movement, devices operating at spaced points in the path or cycle of movement of the chamber for supplying to the chamber material to be treated, for supplying a treating fluid under pressure, and for permitting the chamber to be suddenly opened under pressure of the treating fluid therein to cause the discharge of the material therefrom and an expansion of the treating fluid.

2. In a machine of the character described, a member having a treating chamber, devices operating at definite intervals for successively supplying thereto material to be treated and a treating fluid under pressure, and for subsequently permitting the chamber to be suddenly opened under the pressure of the treating fluid therein to permit an expansion of the treating fluid and the discharge of the material from the chamber.

3. In a machine of the character described, a feeding chamber and devices operating at definite intervals for successively opening the chamber for the supply thereto of material to be treated for closing the chamber, for supplying thereto a treating fluid under pressure, and for permitting the chamber to be suddenly opened under the pressure of the treating fluid therein to cause an expansion of the fluid and the discharge of the material.

4. In a machine of the character described, a movable member having a treating chamber provided with a cover, means for shifting said member through a definite path of movement, and devices acting when said chamber reaches different positions in its path or cycle of movement for successively opening the chambers for the supply of material to be treated, for supplying treating fluid under pressure, and for suddenly releasing the cover so that the chamber may be opened under the pressure of the fluid therein to cause an expansion of the fluid and the discharge of the material from the chamber.

5. In a machine of the character described, a movable member having a treating chamber, a valve at the upper end of the chamber for the admission of material to be treated, a valve operating device, and means for shifting said member so that the chamber is moved past the valve operating device and the valve will be operated by the latter whereby material may be supplied to the chamber.

6. In a machine of the character described, a movable member having a treating chamber, a stationary part with respect to which said member moves, and means for supplying to the chamber a treating fluid under pressure when the chamber reaches a definite position comprising ducts in the movable member and stationary part and adapted to be brought into registration by the movement of said member and means acting to permit the chamber to be opened under the pressure of the fluid therein when the chamber reaches another definite position.

7. In a machine of the character described, a movable member having a plurality of treating chambers, a device above said chambers for delivering material thereto, and means whereby said chambers are successively opened at the upper part thereof as they are moved past the material delivery member.

8. In a machine of the character described, a movable member having a plurality of treating chambers, each with a valve at the upper part thereof for the admission of material to be treated, a material delivery member above the chamber, and an automatic valve opening device for opening said valves in the different chambers as the latter reach a given position with respect to said material delivery member.

9. In a machine of the character described, a movable member having a plurality of treating chambers, and means for delivering a treating fluid under pressure to each chamber as it reaches a given position in its path of movement and means acting to permit each chamber to be opened under the pressure of the fluid therein when it reaches a definite position in its path of movement.

10. In a machine of the character described, a stationary part and a movable part having a plurality of treating chambers, and means for supplying a treating fluid under pressure to the different chambers when they reach a given position, said means comprising a delivery duct in the stationary part, and ducts in the movable part and extending to the different chambers and adapted to be successively brought into registration with the delivery duct and means acting to permit each chamber to be opened under the pressure of the fluid therein when the chamber reaches a certain position in its path of movement.

11. In a machine of the character described, a movable member having a plurality of treating chambers each provided at one end with a valve for the admission of material to be treated, and at the opposite end having a cover for the discharge of material, and means for moving said member.

12. In a machine of the character described, a movable member having a treating chamber provided with a valve for the admission of material to be treated, and with a cover for the discharge of material, means for causing the valve to be opened and then closed, while the chamber is moving through a given part of its movement, and means for subsequently causing the cover to be released when the chamber reaches a definite position in its path of movement.

13. In a machine of the character described, a movable member having a treating chamber, devices acting at different points in the movement of the chamber for successively causing the chamber to be opened for the supply of material to be treated and for causing a treating fluid under pressure to be supplied to the chamber, a movable cover for the chamber, and means for causing the release of the cover when the chamber reaches still another position in its movement so that the chamber may be suddenly opened by the pressure of the fluid therein for the discharge of the material and the expansion of the treating fluid.

14. In a machine of the character described, a movable treating chamber having a hinged cover, and a track holding the cover closed, said track having means by which the cover is automatically released when the chamber reaches a given position in its path of movement so that the chamber may be suddenly opened by the fluid pressure therein.

15. In a machine of the character described, a movable member having a treating chamber provided at one end with a hinged cover, and a segmental track which said cover engages during a portion of its movement and which permits the opening of the cover when the chamber reaches a given position in its path of movement.

16. In a machine of the character described, a chamber having a yielding seat at one end, a hinged cover normally closing the chamber and normally held in engagement with said seat, and means normally engaging said cover to hold the same closed and to permit the opening of the same when the chamber reaches a given position.

17. In a machine of the character described, a movable member having a treating chamber and provided with a hinged cover having a roller, and a track which said roller engages to hold the cover closed while the chamber is moving through a portion of its path of movement, and which permits the cover to be opened when the chamber reaches a given position.

18. In a machine of the character described, a movable member having a treating chamber, said chamber having a hinged cover with a yieldingly mounted roller, and a segmental track which said roller engages to hold the cover closed when the chamber is moving through a portion of its movement, and which permits the cover to be suddenly opened when the chamber reaches a given position.

19. In a machine of the character described, a frame having a segmental track, and a movable member having vertically disposed treating chambers, each provided at the bottom with a hinged cover having a roller normally engaging said track.

20. In a machine of the character described, a rotary member having a plurality of vertical treating chambers, means at the top of said chambers adapted to be opened and closed for the admission of material to be treated, and covers at the lower ends of the chambers, each provided with a supporting roller and a segmental track which said rollers engage during the major portion of each rotation of said member.

21. In a machine of the character described, a movable member having a treating chamber with a normally closed cover, means for delivering to the chamber material to be treated when the chamber reaches a given position, means for causing fluid under pressure to be supplied to each chamber when it reaches another position, and means for causing the cover of each chamber to be released for the discharge of material and for the sudden expansion of the treating fluid when the chamber reaches still another position.

22. In a machine of the character described, a stationary part, a movable member having a plurality of chambers each provided with a normally closed cover, means for delivering to each chamber material to be treated when the chamber reaches a given position, means for causing fluid under pressure to be supplied to each chamber when it reaches another position, means for causing the cover of each chamber to be released for the discharge of material and for the sudden expansion of the treating fluid when the chamber reaches still another position, said means for admitting the fluid comprising a duct in the stationary part and ducts in the movable member, said last named ducts each extending to one of said chambers and adapted to be brought into registration with the first named duct.

23. In a machine of the character described, a movable member having a plurality of treating chambers each provided with a normally closed cover, means for causing each chamber to be opened for the admission of material to be treated when the chamber reaches a given position, means for causing fluid under pressure to be supplied to each chamber when it reaches another position, means for causing the cover of each chamber to be released for the discharge of material and for the sudden expansion of the treating fluid when the chamber reaches still another position, the means for opening the chamber for the admission of material comprising a valve and a device for operating the valve.

24. In a machine of the character described, a movable member having a plurality of treating chambers each provided with a normally closed cover, means for delivering material to be treated to each chamber when the chamber reaches a given position, means for causing fluid under pressure to be supplied to each chamber when it reaches another position, means for causing the cover of each chamber to be released for the discharge of material and for the sudden expansion of the treating fluid when the chamber reaches still another position, said means for releasing the cover comprising a part which for a portion only of the movement retains the cover in closed position.

25. In a machine of the character described, a member having a chamber adapted to receive material to be treated, a cover for the chamber held closed during the treating interval, means whereby the cover is released so that it may be suddenly opened, and a pneumatic shock absorbing device for stopping the opening movement of the cover.

26. In a device of the character described, a member having a chamber adapted to receive material to be treated and adapted to receive a treating fluid under pressure, a cover for the chamber, a yielding seat at the end of the chamber for the cover, and means for pressing the cover against said seat.

27. In a device of the character described, a member having a chamber adapted to receive material to be treated and to receive treating fluid under pressure, a cover for the chamber, a seat for the cover at the end of the chamber, and a yielding backing for said seat.

28. In a device of the character described, a member having a chamber adapted to receive material to be treated and to receive a treating fluid under pressure, a cover for the chamber, a yielding seat at the end of the chamber and adapted to be engaged by the cover, and a spiral member in said chamber and constituting a backing for the seat.

29. In a device of the character described, a movable member having a treating chamber, a cover for the chamber, and means acting through a portion of the movement of the chamber to hold the cover closed, and serving when a given position of the chamber is reached to release the cover so that the chamber may be suddenly opened under the pressure of the fluid therein.

In testimony whereof, we hereunto affix our signatures.

ARTHUR R. SPENCER.
WILLIAM J. PLEWS.